Figure 1:
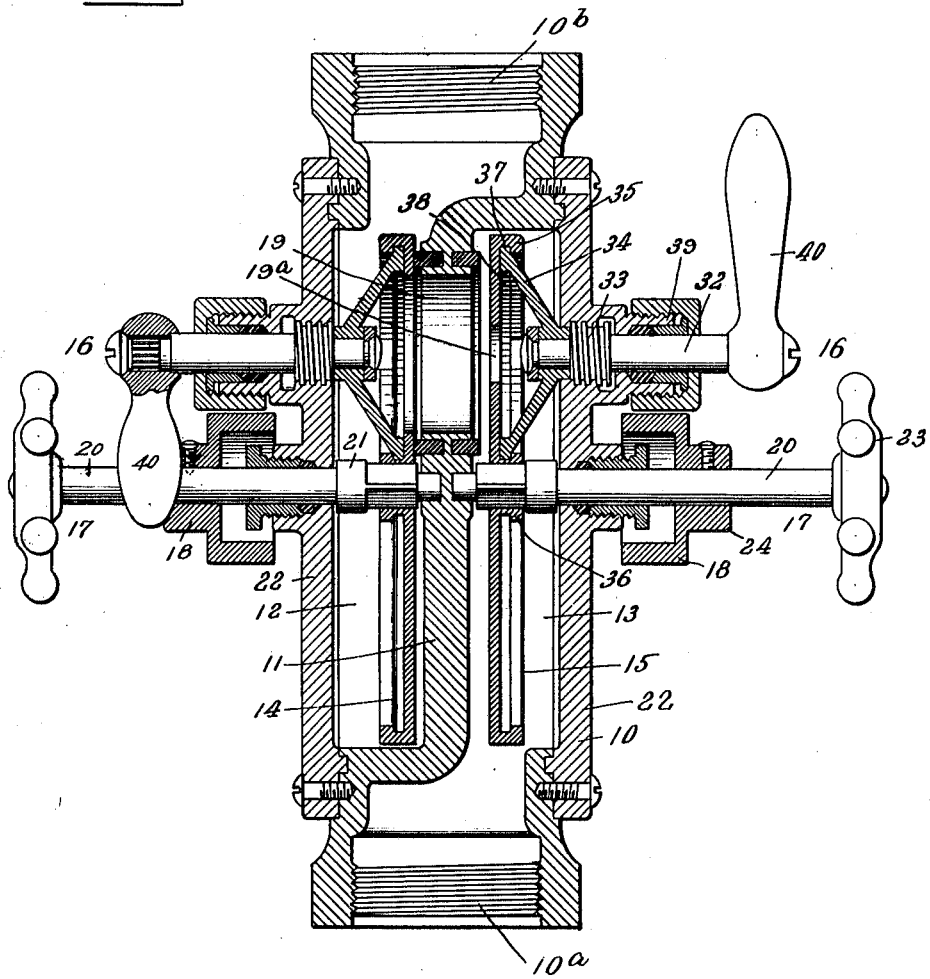

P. MUELLER.
MULTIPLE COCK.
APPLICATION FILED MAR. 28, 1911.

1,022,375.

Patented Apr. 2, 1912.
4 SHEETS—SHEET 1.

Witnesses
H. C. Rohnette
J. P. Tarbox

Inventor
Philip Mueller

By Ingers. Cushman & Lea
Attorneys

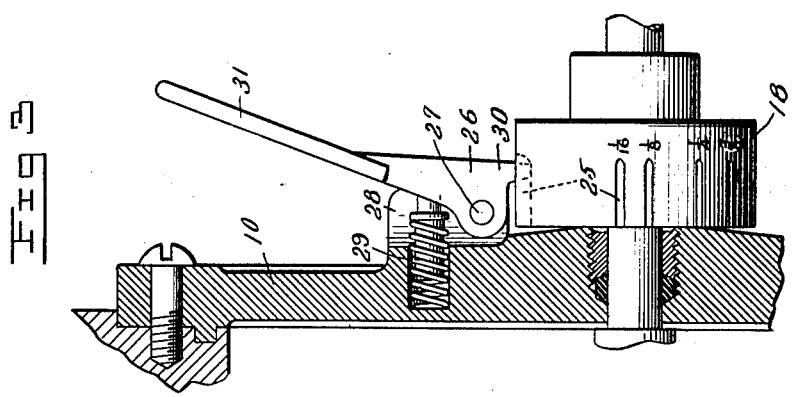
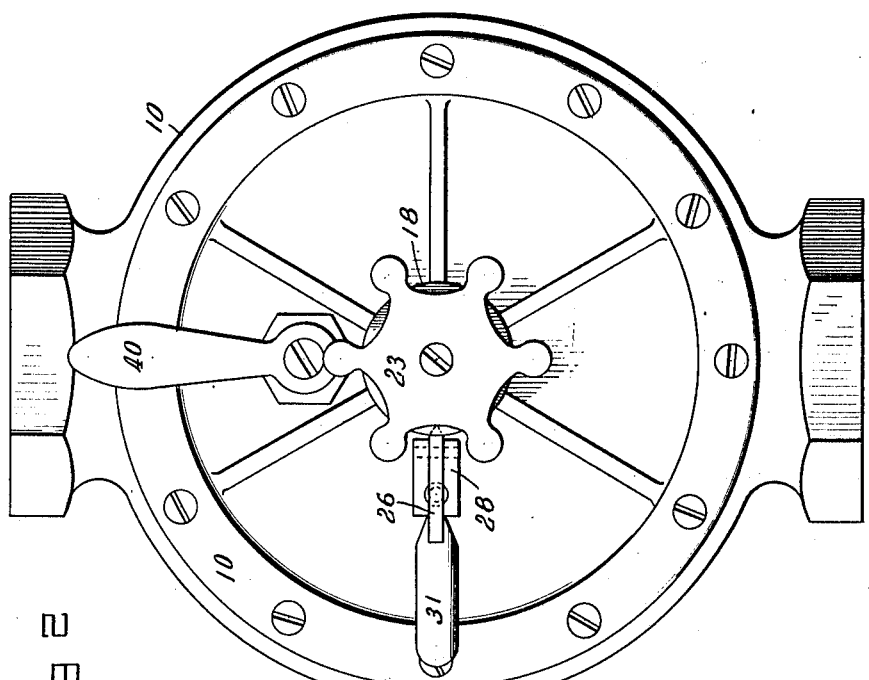

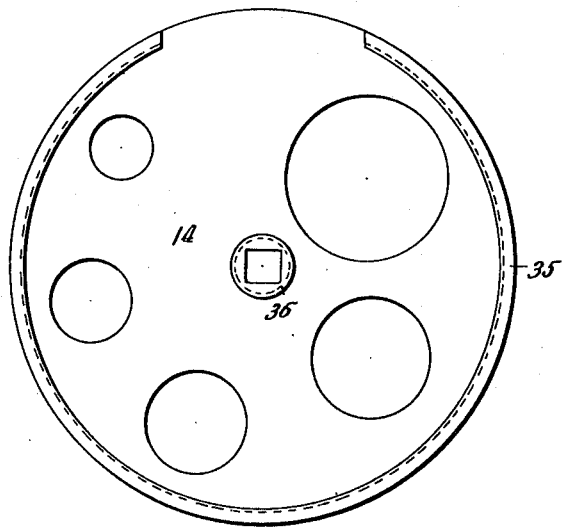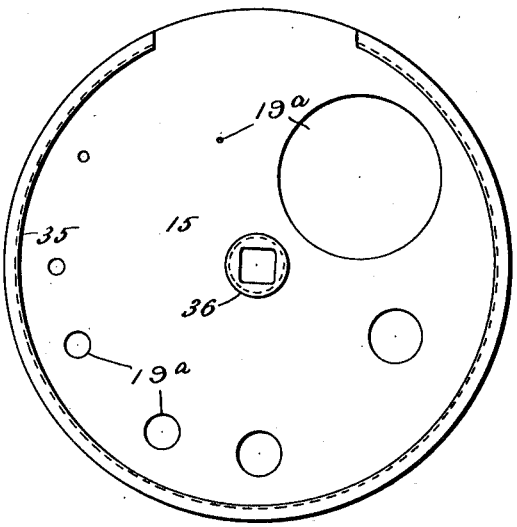

P. MUELLER.
MULTIPLE COCK.
APPLICATION FILED MAR. 28, 1911.
1,022,375.
Patented Apr. 2, 1912.
4 SHEETS—SHEET 4.
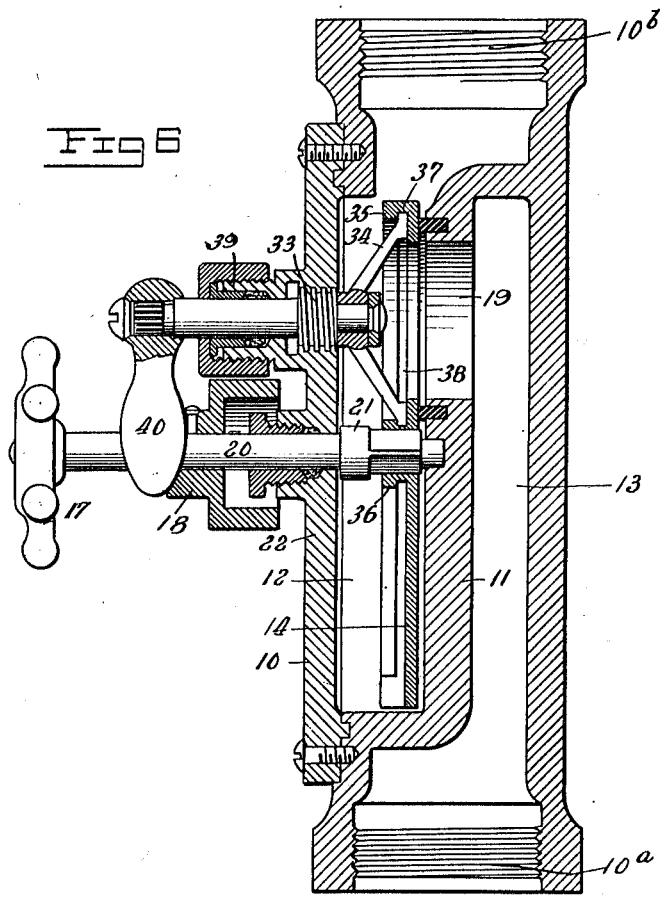
Inventor
Philip Mueller
Witnesses
By Meyers, Cushman & Rea
Attorneys

UNITED STATES PATENT OFFICE.

PHILIP MUELLER, OF DECATUR, ILLINOIS, ASSIGNOR TO THE H. MUELLER MANUFACTURING COMPANY, OF DECATUR, ILLINOIS, A CORPORATION OF ILLINOIS.

MULTIPLE COCK.

1,022,375.  Specification of Letters Patent.  Patented Apr. 2, 1912.

Application filed March 28, 1911. Serial No. 617,517.

*To all whom it may concern:*

Be it known that I, PHILIP MUELLER, a citizen of the United States, residing at Decatur, in the county of Macon and State of Illinois, have invented new and useful Improvements in Multiple Cocks, of which the following is a specification.

My invention consists of a multiple cock particularly adapted for use in connection with water meter testers. While of the particular adaptation stated, however, it will be apparent upon an understanding of my invention that it may be used in part or as a whole in connection with gas or other fluid meter testers.

In the testing of meters it is found that a meter which will give correct indications of the amount of water flowing through it, by a stream of one size, will not give correct indications when the water is caused to flow by a stream of another size. Thus water meters are very frequently found to be inaccurate when measuring water flowing in a stream of one size while they may be highly accurate when measuring water flowing by a stream of another size. Particularly is this true of large meters specifically designed to measure large quantities of water. While accurate in the measurement of large streams of water they are very often inaccurate in measuring small streams of water. The same thing is true of many average sized meters. It is, therefore, extremely desirable and of great importance that a meter should be tested measuring both large and small streams in order that error in the measurement of small streams may be corrected.

Heretofore when meter testers were used for testing meters on streams of varying sizes, the size of the stream has been adjusted by throttling and by the use of different sized discharge pipes or nozzles. The first of these devices is not satisfactory for the reason that it requires very accurate adjustment, and for the reason that the quantity of fluid flowing through the throttled orifice does not vary according to a regular law, but varies according to the shape of the throttled opening and according to the configuration of the valve seat and disk, etc. The second of the devices mentioned is unsatisfactory for the reason that when the size of the discharge pipe is changed the connections must be made and broken with a resultant loss of time and increase in expense. It is highly desirable that besides being accurate a meter tester should be so equipped as to be capable of most rapid manipulation in order that the day's run of tested meters may be a maximum.

The multiple cock of my invention obviates all of the above mentioned disadvantages. By the use of this cock, the size of the stream may be regulated with absolute exactness, and at the same time may be varied any desired amount with great ease and rapidity. Specifically, I provide a valve body having a member with a valve opening for the flow of fluid from one chamber of the body on one side of the member to another chamber of the body on the other side of the member, and provided with means whereby the stream of fluid which flows through the opening may be constricted to any one of a number of predetermined sizes. In the preferred form of my invention the stream may be constricted to circular form of any one of a number of predetermined diameters, these diameters being chosen with respect to the sizes of the streams which the meter is supposed to measure in practice.

In the accompanying drawings I have shown one embodiment of my invention. This embodiment comprises in general a casing, a valve seat member, a valve disk member, one of said valve seat and disk members being an apertured member provided with a series of apertures of different sizes, means for moving the members relatively to bring any desired aperture into coöperative relation with the other member, means for clamping the valve disk member upon the seat of the valve seat member, and means for indicating the size of the particular aperture which is being used.

Referring to the drawings,—Figure 1 is a central, transverse section of the cock of my invention. Fig. 2 is a side elevation of the same. Fig. 3 is a detail of the indicating mechanism,—and Figs. 4 and 5 are elevations of two of the apertured members employed. Fig. 6 is a central, transverse section of a modified form.

The valve casing is designated generally 10, and is provided with inlet and outlet openings 10$^a$ and 10$^b$.

11 is the valve seat member which in this embodiment lies with its main body parallel to the side wall of the casing 10, thus dividing the interior of the casing into two chambers 12 and 13, one on each side of the valve seat member 11.

14 and 15 are the valve disk members which coöperate with the valve seat member 11.

16, 16 designate generally the means for clamping the disks to the seats, and 17, 17 the means for adjusting the valve disk members 14 and 15 with respect to the seat member 11, and 18, 18, the indicating and locking devices associated with the adjusting means 17, 17.

As shown, the body of the valve casing in this embodiment is circular and relatively shallow, being somewhat disk-shaped. The valve seat member 11 is provided with an eccentrically positioned circular aperture 19. The valve disk members 14 and 15 are each provided with a plurality of circular openings disposed on a concentric arc, the radius of which is equal to the radius of eccentricity of the opening 19 in the valve seat member 11. As clearly seen in Figs. 4 and 5, the apertures of the disk 14 are graded in diameter from a maximum to a minimum, while those of the member 15 are similarly graded in diameter in continuation of the graded series of apertures of the disk 14. The disk having the smaller apertures also has a large aperture the same size as the largest aperture in the other disk. (See Figs. 4 and 5.) In actual practice, these apertures in member 15 are made of diameters varying from one-thirty-second to five-eighths inch, while those in member 14 are made of diameters varying from three-fourths to two inches. The disk 15 has also a two-inch aperture. These valve disk members are slidably mounted on the squared ends of stems 20 of the adjusting mechanism 17, these stems 20 passing centrally through the opposite walls 22 of the casing 10 and having their ends reduced in diameter journaled in the central valve seat member 11. The portions adjacent the squared ends are somewhat enlarged, as at 21, the outer shoulders of the enlarged portions being engaged by the side walls 22 of the casing 10, which side walls are removable. Thus the adjusting members 20 and the valve disk members are associated with the walls of the casing and held in position, but are at the same time freely removable with the side walls of the casing. By means of the hand wheels 23 on the stems 20 the members 14 and 15 may be revolved to bring opposite the opening 19 an aperture of any desired diameter.

The indicating means by which the size of the particular aperture 19ª being used is indicated comprises an indicating member 24 on each stem 20 in the shape of a flanged collar. This collar is circumferentially slotted at a plurality of points 25 corresponding in relative position to the relative positions of the apertures 19ª in the respective disk member. They are correspondingly marked with the diameter of the aperture whose position they designate. Co-acting with these slots 25 is a fixed latch 26 pivoted at 27 between the ears 28 formed integrally with the outer walls 22 of the casing. The latch is normally pressed outward by a spring plunger 29 so that its end 30 engages in one of the slots 25, and is provided with an operating handle 31 by which the pressure of the spring plunger may be overcome and the end 30 be moved from the slot engaged by it. The indicating member 24 is made adjustable with respect to the stem 20 for a purpose which will presently appear.

The means 16 for clamping the valve disk members 14 and 15 to the valve seat member 11 comprises in each case a valve stem 32 provided with a common form of motive screw threads 33 engaged in the walls 22 of the casing, and a means in the form of a crow foot 34 engaging the respective valve disks. The valve disks are provided with inner and outer flanges 36 and 35, the flanges 35 being internally grooved and the flanges 36 exteriorly grooved to accommodate the ends 37 of the crow feet which are shaped to fit them. Preferably these crow feet are swiveled on the ends of the stems 32 and their engaging ends 37 are connected by a circular ring of metal 38. In order to admit the rings 38 to the grooves the flanges 35 are cut-away for a distance, as shown in Figs. 4 and 5. By virtue of this construction the disks are moved perpendicularly to the seats, and tearing of the packings of the seat and distortion of the disk are prevented. This is valuable when there has been corrosion and the valve disk has stuck. A packing of a commonly used form 39 is provided between the stems 32 and the walls of the casing, and operating handles 40, adjustable with relation to the stems 32 as shown in section on the left of Fig. 1, are placed on the ends of the stems for turning them.

With this understanding of the structural features of my invention, its operation and great resultant advantages of use should be apparent. By releasing the clamping means 16 by turning the valve handles 40 in the usual manner, and then releasing the stems 20 of the adjusting mechanism by pressing inward the handle 31 of the latch 26, the disk members may be adjusted to bring any desired opening 19ª into register with the opening 19. Thus for instance if it is desired to restrict the stream of flowing water to one of five-eighths inch diameter, the one of the stems 20 carrying the disk which has that aperture is turned until the slot 25 marked five-eighths inch comes opposite the latch 26, whereupon the latch is allowed to engage the slot and the stem 20 is therefore held locked in adjusted position. Thereafter by turning the handle 40 the disk 15 bearing this aperture or a larger one may be clamped to the seat of the opening 19. The flowing stream is therefore constricted to five-eighths inch diameter. While operating under these conditions, the opposite disk 14 is clamped to the seat member 11, with the largest opening in the disk 14 in register with opening 19. Similarly the disk 15 is clamped with its largest aperture in register with opening 19 when it is desired to constrict the stream by the smaller apertures of disk 14. Thus it should be evident that any one of the apertures may be brought into register with aperture 19 and the diameter of the stream most quickly and most accurately regulated. By virtue of the provided means of adjustment of the handles 40 with respect to the stems 32, these handles may be so positioned as not to be interfered with by the stems 20. By virtue also of the provided means of adjustment of the indicating and locking members 24 on the stems 20 these members may be so adjusted with respect to the valve disk members and the latch 26 as to permit of the positioning of the latch as shown in Fig. 2 where it will not interfere with the operation of the handles 40.

In Fig. 6 I show a modification which differs structurally from the form just described in that only one valve disk member is used, as shown the left hand one 14. The right hand disk 15 and associated operating means are omitted, and the right side omitted, and the right side wall is formed integral and non-removable. This valve is of more limited capacity than the valve of double construction of the same diameter of valve disk, but operates in the same manner. There are many situations in which it may be preferable to use this construction.

While I have described the best form of my invention now known to me, I desire not to be limited thereto, since it is apparent that many changes may be made by those skilled in the art without departing from the broad idea of my invention.

What I claim is:—

1. A multiple cock comprising a casing, a valve-seat member, a valve-disk member, one of said members having a series of apertures of different sizes, adjusting means for one of the members to bring the desired aperture into operative relation with the other member, and independent - manually - operable clamping means arranged eccentric to the said adjusting means for positively moving one of the members longitudinally toward and from the other member whereby the members may be clamped against movement relative to one another when adjusted and may also be separated to provide for free movement of one member relative to the other.

2. A multiple cock comprising a casing, a valve seat member, a valve disk member, one of said seat and disk members being an apertured member provided with a series of apertures of different sizes, means for moving the members relatively to bring any desired aperture into operative relation with said other member, independent means for clamping the valve disk member upon the valve seat member, and adjustable means without the casing to determine the relative position of the members.

3. A valve as specified comprising a casing having an intermediate seat member provided with an eccentric bore, disk valves arranged against the opposite sides of the seat member and having series of openings adapted for individual registration with the bore of the seat member, means for turning said disk valves against the seat member, and independent means for binding the disks separately against the opposite sides of the seat member, said means including rings for engagement with the disk valves to distribute the pressure on all sides of the registering openings.

4. A valve comprising a casing having an intermediate seat member formed with an eccentric opening, registering stems journaled through the sides of the casing and having their inner ends supported for rotation in the seat member, disk valves movable longitudinally upon the inner ends of the stems and adapted to be brought to bear against the opposite sides of the seat member, each disk having a series of openings varying in size, any one of which is adapted for registration with the opening in the seat member, and separate clamping means carried through the opposite sides of the casing and arranged eccentric to the said stems for separately moving the disks toward and from the seat member to positively hold the same from rotation or to free them for rotation.

5. A valve comprising a casing having an intermediate seat member, said casing being provided with detachable opposed sides, stems journaled through the sides, disk valves movable longitudinally upon the inner ends of the stems for engagement against the seat member, separate manually operable clamping means extending through the sides and arranged eccentric to the stems for positively moving the disks longitudinally toward and from the seat member, and separate indicating means carried upon said stems to determine the positions of the disk valves with relation to the valve seat.

6. A valve as specified comprising a valve casing having detachable sides, and an intermediate seat member provided with an eccentric opening, stems journaled through the sides, valves mounted upon the stems for rotation therewith and having series of openings adapted to individually register with the eccentric opening of the valve seat, adjustable indicating means carried upon the stems for determining the positions of the openings in the disk valves, and manually operated clamping means carried upon the detachable sides for engagement with the disks to positively lock the same from movement.

7. A valve comprising a casing having an intermediate seat member, a disk arranged within the casing and having a plurality of openings, any one of which may be brought into register with the seat member, means for rotating the disk, and clamping means within the casing arranged eccentric to the disk for positively moving the latter into clamping contact with the seat member.

8. A valve as specified comprising a casing having a central seat member, disks arranged upon opposite sides of the seat member for simultaneous and independent engagement thereagainst, each disk having a plurality of openings any one of which may be brought into register with the seat member, means for rotating said disks, and separate clamping means within the casing eccentric to the said disk-rotating means and adapted for independent operation against the disks for moving the latter into clamping contact with the seat member.

9. A multiple cock of the character described including a casing, a valve seat within the casing, an apertured disk mounted for movement relative to said seat, and independent manually operable clamping means arranged eccentric to the disk and having eccentric engagement therewith for moving the disk into clamping contact with the seat and for positively moving the disk away from the seat.

10. A valve as specified comprising a casing, a seat member in the casing, valve disks arranged on opposite sides of the seat member, rotating stems journaled through the casing and having a connection with the valve disk, indicating means on the stems adapted to determine the positions of the valve disks relative to the seat member, latches carried at the opposite sides of the casing for locking the stems when adjusted, and clamping means carried in the casing for binding the valve disks independently against the opposite sides of the seat member.

11. A valve as specified comprising a casing having an intermediate seat member, disk valves mounted for rotation on opposite sides of the member, separate indicating means arranged outside the casing and having connection with the disk valves for determining the positions of the same, locking means for the disk valves to hold the same from rotation, and clamping means within the casing for independent operation upon the disk valves to bind the same against the seat member.

12. A multiple cock comprising a casing, a valve seat member, a valve disk member, one of said valve seat and disk members being an apertured member provided with a series of apertures of different sizes, a valve opening in the other member, and means comprising a valve stem, and a crow foot connected to the stem and adjustably connected to the disk member for clamping the valve disk member upon the valve seat member.

13. A multiple cock comprising a casing, a valve seat member, a valve disk member, one of said valve seat and disk members being an apertured member provided with a series of apertures of different sizes, a valve opening in the other member, means for moving the members relatively to bring any desired aperture into register with the valve opening, and means for clamping the valve disk member upon the valve seat member comprising a stem, inner and outer grooves on the valve disk and a crow foot connected to the stem and engaging the said grooves.

14. A valve comprising a casing having a seat member provided with an opening, a valve-disk member rotatable within the casing and having a plurality of openings, any one of which may be brought into register with the opening in the seat member, means outside the casing for rotating the disk-member, and separate manually operable means arranged eccentric to and coöperatively associated with the disk member for positively moving that portion of the disk member surrounding the opening in the seat into and out of clamping contact with the seat.

15. A multiple cock comprising a body casing, a valve seat member in said casing, said valve seat being provided with a valve opening, a valve disk on each side of said seat member, each of said valve disk members being provided with a graded series of openings, the series in one disk being in continuation of the series in the other disk, means for adjusting each disk with respect to the valve seat member to bring into register any desired aperture with the valve opening, and means for clamping each disk in its adjusted position.

16. A multiple cock comprising a casing having an intermediate apertured web providing a valve seat, a valve disk member in the casing adjacent the web and having a series of apertures of different sizes, turning means for the valve disk member to bring the desired aperture into registration with the aperture in the web and independent manually operable means arranged eccentric to the valve disk member for positively moving said disk member longitudinally toward and from said web whereby said member may be brought into clamping engagement with the web and may also be moved from contact therewith.

17. A multiple cock comprising a casing, a valve seat member, a valve disk member, one of said seat and disk members being an apertured member provided with a series of apertures of different sizes, means for moving the members relatively to bring any desired aperture into operative relation with said other member, means for locking the members in the adjusted positions, and means for clamping the valve disk member upon the valve seat member.

18. A valve as specified comprising a casing having an intermediate seat member, stems journaled through the casing and extending oppositely from the seat member, disk valves fixed upon the stems for rotation therewith and for longitudinal movement independently of the stems, indicating means arranged between the stems and the casing for determining the positions of the valves when adjusted, and separate clamping means carried by the casing for engagement with the disk valves to bind the same against the opposite sides of the seat member.

19. A multiple cock comprising a casing having an inlet and an outlet and a partition in said casing provided with an opening, valve seats around said opening on opposite sides of the partition, opposed valve-disk members, one located on each side of the partition, each disk having a graded series of openings, those in one disk being progressively larger than those in the other disk, and the disk having the smaller series of openings being provided with an enlarged opening at least as large as the largest opening in the other disk, and independent means for rotating the disk members to bring any of the apertures of the two series into register with the opening in the partition.

In testimony whereof I have hereunto set my hand in presence of two subscribing witnesses.

PHILIP MUELLER.

Witnesses:
LEONARD F. McKIBBEN,
WILLIAM R. BIDDLE.